United States Patent [19]

Kaneko et al.

[11] Patent Number: 5,610,724
[45] Date of Patent: Mar. 11, 1997

[54] IMAGE FORMING SYSTEM

[75] Inventors: Masaru Kaneko, Yokohama; Shigeru Yamazaki, Tokyo; Akihiko Motegi, Tokyo; Masaki Narita, Tokyo; Hiroshi Komai, Atsugi, all of Japan

[73] Assignee: Ricoh Company, Ltd., Tokyo, Japan

[21] Appl. No.: 490,011

[22] Filed: Jun. 13, 1995

[30] Foreign Application Priority Data

Jun. 14, 1994 [JP] Japan .................................. 6-132276

[51] Int. Cl.⁶ .................................................. G03G 21/00
[52] U.S. Cl. ........................................ 358/400; 399/18
[58] Field of Search ................................... 355/201, 308, 355/321–323, 208–209, 206; 358/400, 402–403

[56] References Cited

U.S. PATENT DOCUMENTS 4,944,422  7/1990  Aurness et al. ............................ 220/20
5,417,488  5/1995  Horton .................................. 312/208.3
5,452,058  9/1995  Umeda .................................. 355/201

FOREIGN PATENT DOCUMENTS

| 1-136470 | 5/1989 | Japan . |
| 1-176161 | 7/1989 | Japan . |
| 4-48323 | 2/1992 | Japan . |
| 5-213519 | 8/1993 | Japan . |

Primary Examiner—Stephen Brinich
Attorney, Agent, or Firm—Oblon, Spivak, McClelland, Maier & Neustadt, P.C.

[57] ABSTRACT

In an image forming system, an image forming apparatus with an optional main box having a plurality of bins prevents the cover of each bin from being locked in its closed position unless papers output to all the bins are taken out. Hence, all the bins are empty when they are used later, and can be used by any users. This implements a mail box which can be efficiently used by many users.

6 Claims, 12 Drawing Sheets

FLAG$MB

IMAGE FORMING SYSTEM

BACKGROUND OF THE INVENTION

1. Field of the Invention

The present invention relates to a network, work station, personal computer system or similar image forming system including a plurality of host computers. More particularly, the present invention is concerned with an image forming system wherein an optional mail box, or paper outputting means for personal management, is connected to an image forming apparatus.

2. Discussion of the Background

An image forming system of the kind described has recently been put on the market and has an optional mail box connected to an image forming apparatus. The mail box has personal paper outputting devices and a general or shared paper outputting device in order to allow various kind of information to be interchanged. Japanese Patent Laid-Open Publication No. 2-186429, for example, proposes a network type printing system shared by a plurality of computers and having a plurality of trays for receiving printings. In this system, some of the trays are each provided with a key lock and are unlocked by an ID code received from a particular host, thereby ensuring the secrecy of printings or documents. Japanese Patent Laid-Open Publication No. 4-48323 teaches an image forming system capable of protecting private data printed out by a printer from a third party. This system has means for determining whether or not the printed data are meant for a particular user, paper outputting means for outputting personal printings and general printings separately on the basis of the result of decision, and a stacker for receiving the personal printings. Only if a password entered is identical with a password assigned to the user, the stacker allows the private printings to be taken out.

The conventional image forming systems described above guarantee the secrecy of documents. However, because the mail box of the system is often used as a private spot for outputting printings, any trouble occurring in processings dealing with a single user prevents printing meant for other users from being started.

SUMMARY OF THE INVENTION

It is, therefore, an object of the present invention to provide an image forming system which allows many persons to use a main box efficiently.

An image forming system of the present invention has a printer, a mail box having a plurality of bins controlled by a command from a host computer via serial communication between the host computer and the printer, a cover covering one of the bins for personal use, a locking mechanism for locking the cover, and a detecting device for determining whether or not a paper is present in any of the bins. A controller inhibits, after the cover has been unlocked, then opened, and then closed, the locking device from locking the cover if the detecting device determines that a paper is left in any of the bins.

Also, an image forming system of the present invention has a printer, a mail box having a plurality of bins controlled by a command from a host computer via serial communication between the host computer and the printer, a cover covering one of the bins for personal use, a locking mechanism for locking the cover, and a detecting device for determining whether or not a paper is present in any of the bins. A controller produces, after the cover has been unlocked, then opened, and then closed, an alert if the detecting device determines that a paper is left in any of the bins.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
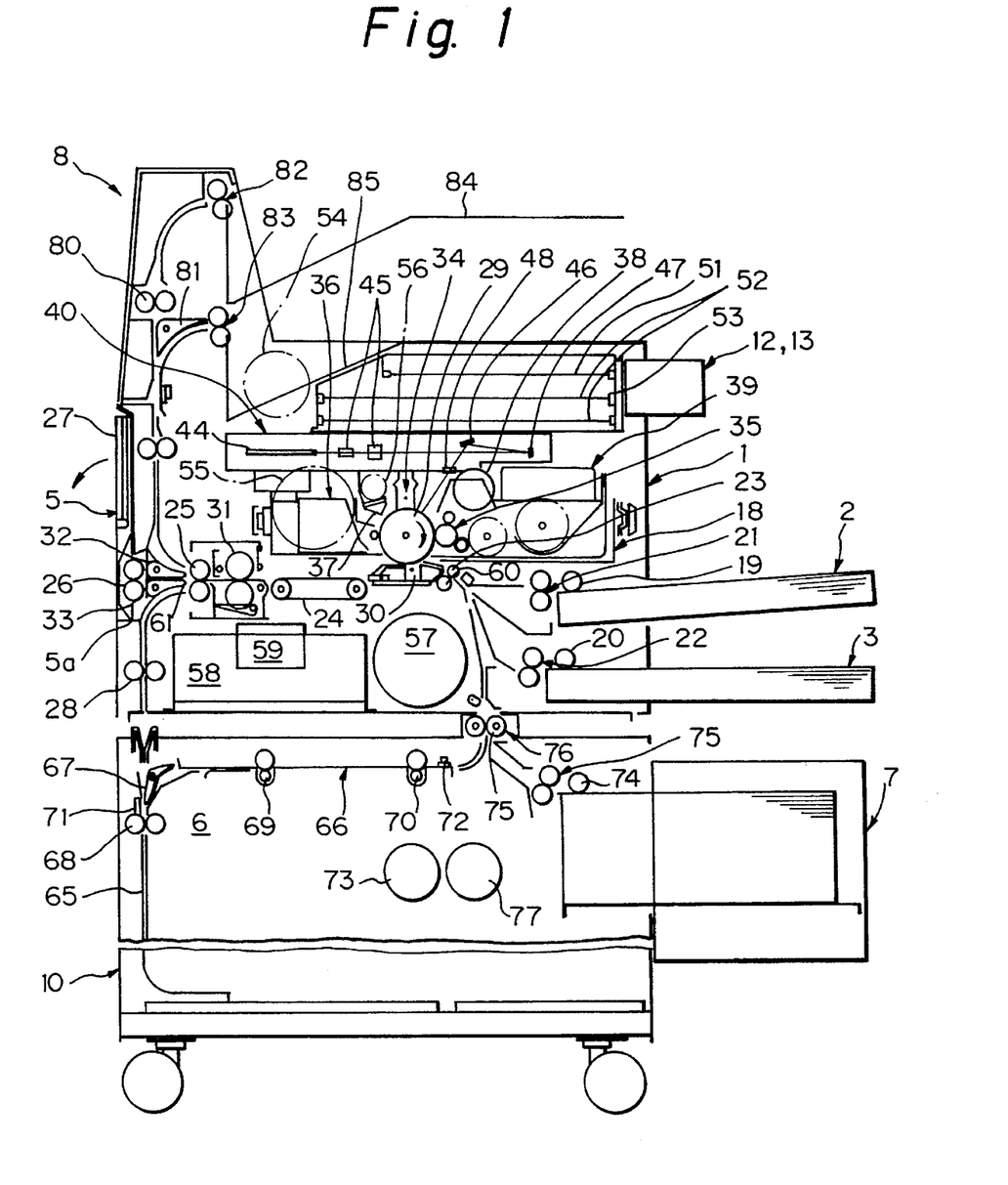
FIG. 1 is a section showing the general construction of an image forming apparatus included in an image forming system embodying the present invention.
Figure 2:
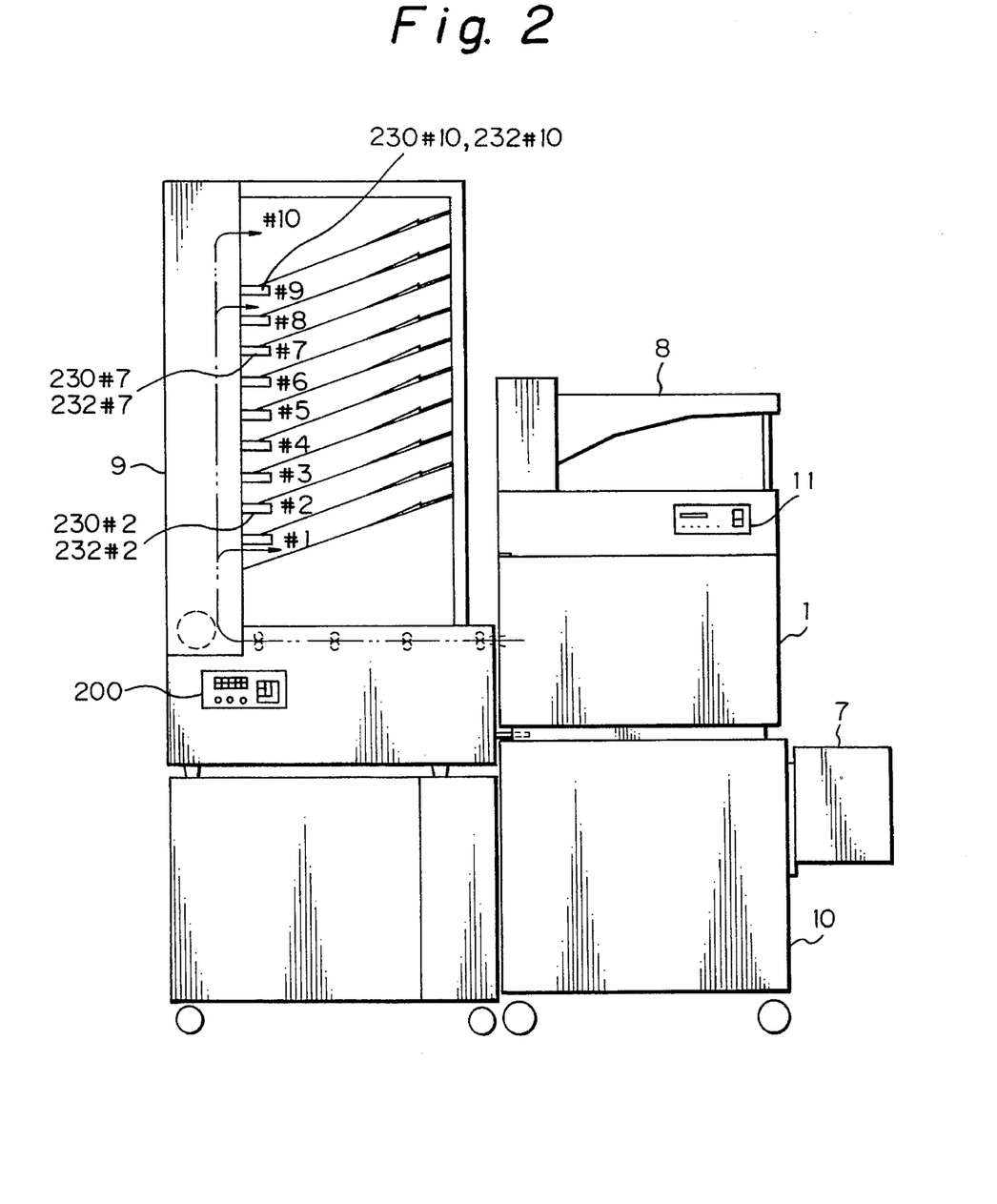
FIG. 2 is a front view of the apparatus with optional personally managed paper outputting means connected thereto.
Figure 3:
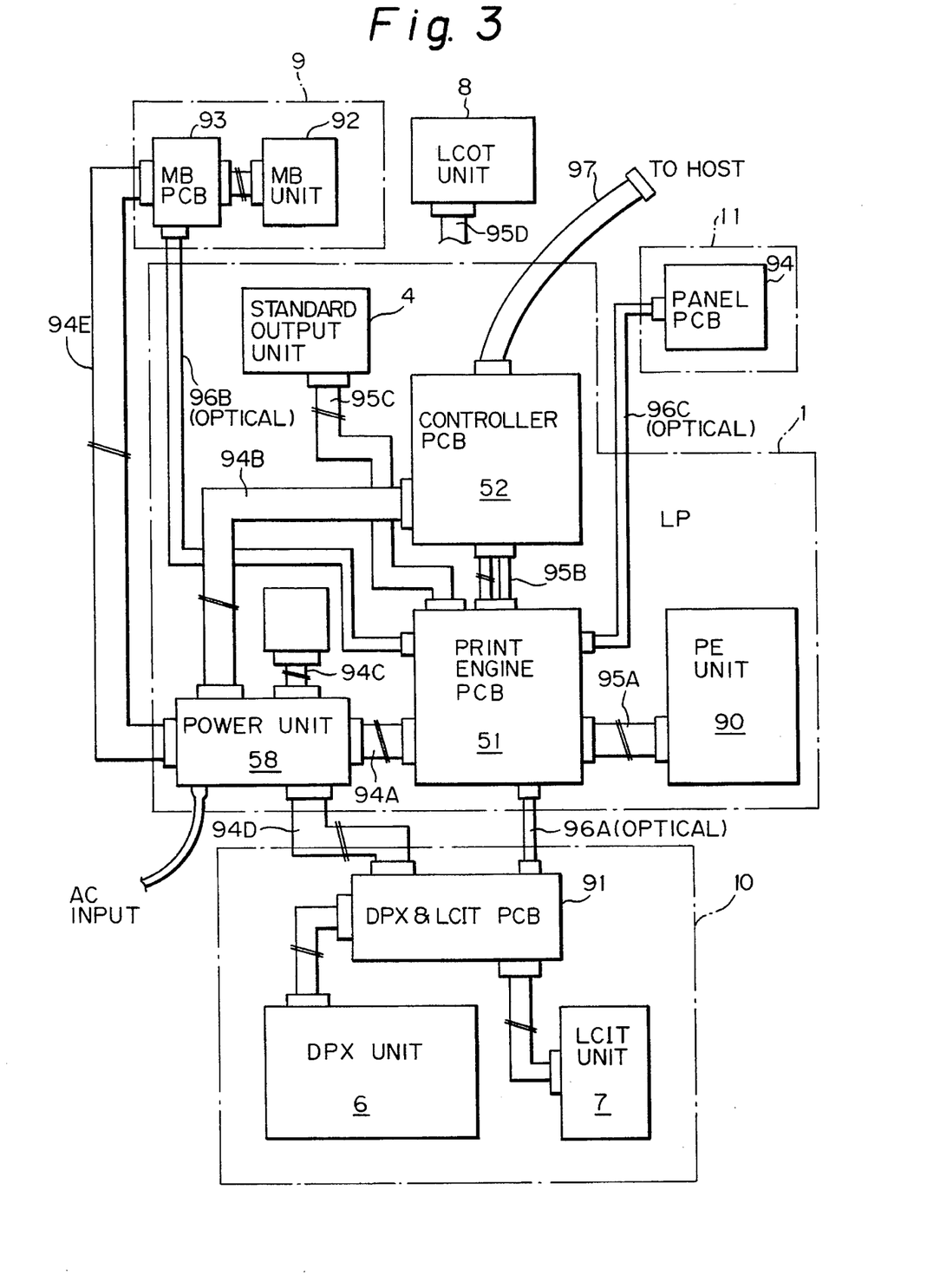
FIG. 3 is a block diagram schematically showing a control system included in the apparatus.

Referring to FIGS. 1–3 of the drawings, an image forming system embodying the present invention is shown. First, the mechanical arrangement of a printer included in the embodiment will be described. As shown in FIG. 1, the printer has a laser printer (LP) body, or image forming means, 1, an upper paper cassette 2, a lower paper cassette 3, a large capacity paper output (LCOT) unit 8 having an upper discharge section and a lower discharge section, and a rear paper output tray 5. In addition, a duplex copy (DPX) unit 6 for producing duplex or two-sided copies, and a large capacity paper input (LCIT) unit 7 are positioned at the bottom of the printer. FIG. 2 shows a mail box (sometimes abbreviated as as MB hereinafter) 9 having ten bins #1 to #10 and substituted for the LCOT 8 unit. The system, including the LP body 1, may be provided with various kinds of configurations by the selection of the optional DPX unit 6, LCIT unit 7, LCOT unit 8, and mail box 9. An operation and display panel 11, which will be described, is mounted on the top of the LP body 1. Also mounted on the top of the PL body 1 are font cartridges 12 and 13 each accommodating a RAM (Random Access Memory) or ROM (Read Only Memory) storing a particular kind of font data.

The LP body 1 has thereinside an upper and a lower pick-up roller 19 and 20, respectively, two pairs of feed rollers 21 and 22, a pair of registration rollers 23, a conveyor implemented as a belt 24, an outlet roller 25, a rear output roller 26, an upper conveying roller 27, a lower conveying roller 28, and a number of guides. These constituents 19–28 and guides define paper transport paths or a paper transport system.

A photoconductive drum 29 is located above the path extending between the registration rollers 23 and the belt 24 and is implemented by an organic photoconductor (OPC). A transfer charger 30 is positioned below the above-mentioned path. A fixing unit 31 is located between the belt 24 and the outlet roller 25. Further, a pair of path selectors 32 and 33 are positioned between the outlet roller 25 and the rear output roller 26 downstream of the fixing unit 31. Arranged around the drum 29 are a main charger 34, a developing unit 35, a cleaning unit 36, and a LED (Light Emitting Diode) array 37 for dissipating charges. The developing unit 35 is mounted on a drawer 18 together with a motor 38 for development, a toner cartridge 39, and the cleaning unit 36. These constituents form an image forming system.

An image writing section is disposed above the image forming system and is implemented as a laser writing unit 40 including a semiconductor laser, not shown, a polygonal mirror 44 for steering a laser beam issuing from the laser, an f-theta lens 45, a first mirror 47, a second mirror 46, and a dust-proof glass 48. The laser writing unit 40 is conventional and will not be described specifically.

A printed circuit board (PCB) rack 53 is located above the writing section and accommodates a print engine PCB 51 and a controller PCB 52. A PCB pack fan 54 and a main fan 55 respectively cool off the PCBs 51 and 52 and the inside of the LP body 1. Located below the paper transport path are a main motor 57 for driving the drum 29 and various rollers, and a high-tension power source unit 59 for applying high voltages to a power source unit 58 as well as to the chargers.

The paper cassettes 2 and 3 are removably mounted to the LP body 1. The rear output tray 5 is retracted when out of use, as illustrated in FIG. 1. To use the tray 5, it is rotated about a shaft 5a to the rear, as indicated by an arrow in FIG. 1. A registration sensor is positioned upstream of the registration roller pair 23 in the direction of paper transport. An outlet sensor 61 is located at the outlet of the fixing unit 31.

The DPX unit 6 is received in a table 10 and includes a turn-over path 65, a wait path 66, a path selector 67, three rollers 68, 69 and 70 each having a clutch, an inlet sensor 71, an outlet sensor 72, and a DPX drive motor 73. The DPX unit 6 further includes a pick-up roller 74 for picking up a paper stacked in the LCIT unit 7, a feed roller 75, a shared feed roller 76, and an LCIT drive motor 77. The LCIT unit 7 accommodates a mechanism for elevating a paper stack, and a motor for driving it, although not shown in FIG. 1.

The LCOT unit 8 has a roller 80, a path selector 81, an upper output roller 82, a lower output roller 83, an upper output tray 84, a lower output tray 85, a mechanism, not shown, for moving the trays 84 and 85 in their widthwise direction, a motor, not shown, for driving the mechanism (job separation motor), and various kinds of sensors and switches.

A control system for controlling the LP arrangement will be described later in detail. Briefly, image data, for example, are received from a computer, work station, word processor or similar host. The image data are input to the engine PCB 51 via the controller PCB 52 and processed thereby. After a particular paper input path and a particular paper output path have been selected, a printing sequence begins in response to a print start request signal. First, one of the pick-up rollers 19, 20 and 74 is driven to feed a paper from the upper cassette 2, lower cassette 3 or LCIT unit 7 associated therewith. The paper is fed by one of the feed rollers 21, 22 and 75 toward the registration roller pair 23. The roller pair 23 once stops the movement of the paper.

The drum 29 is rotated in a direction indicated by an arrow in FIG. 1. After the main charger 34 has uniformly charged the surface of the drum 29 in rotation, the writing unit 40 scans the surface of the drum 29 in the axial direction with a laser beam modulated in accordance with the image data. As a result, a latent image is electrostatically formed on the drum 29. The developing unit 35 develops the latent image with toner so as to produce a corresponding toner image. When the paper is fed from the registration roller pair 23 at a predetermined timing, the transfer charger 30 is energized to transfer the toner image from the drum 29 to the paper.

The paper with the toner image is separated from the drum 29 and conveyed to the fixing unit 31 by the belt 24. After the fixing unit 31 has fixed the toner image on the paper, the paper is driven out by the outlet roller 25. At this instant, the paper is discharged to one of the trays 84, 85 and 5, depending on the angular positions of the path selectors 32, 33 and 81. Usually, the paper or printing is driven out to one of the trays of the LCOT unit 8 face down. The tray 5 is selected for special cases, e.g., when envelopes, postcards or similar relatively elastic papers are used. Of course, the tray 5 cannot be selected unless it is rotated in the previously mentioned direction and is ready to receive papers from the rear output roller 26.

In a duplex copy mode, the paper carrying the image on one side thereof is driven into the DPX unit 6 of the table 10 by the lower roller 28. Specifically, after the paper has been introduced into the turn-over path 65 and fed in the reverse direction, it is brought to a stop on the wait path 66. Subsequently, the paper is again driven into the LP body 1 by the roller 76 at a predetermined timing. As a result, an image is printed on the other side of the paper. The resulting duplex or two-side printing is driven out to one of the output trays.

A reference will be made to FIG. 3 for describing the control system. As shown, the power source unit 58 of the LP body 1, print engine PCB 51, controller PCB 52, heater included the fixing unit 31, fans 54 and 55, a DPX and LCIT PCB 91 and, when the mail box 9 is mounted, an MB PCB 93 are directly connected by power source lines 94A, 94B, 94C, 94D and 94E. The DPX and LCIT PCB 91 controls the DPX unit 6 and LCIT unit 7. The MB PCB 93 controls the MB unit 92.

The print engine PCB 51 is connected to a print engine (PE) unit (including part of the mechanisms of FIG. 1) 90 and the controller PCB 52 by connection lines 95A and 95B, respectively. The lines 95A and 95B each includes a power source line and a signal line. When the standard paper output unit 4 is mounted, the print engine PCB 51 is connected thereto by a connection line 95C including a power source line and a signal line. Likewise, when the LCOT unit 8 is mounted, the PCB 51 is connected thereto by a connection line 95D including a power source line and a signal line.

The print engine PCB 51 is connected to the DPX and LCIT PCB 91, MB PCB 93 and operation and display panel PCB (simply referred to as a panel PCB hereinafter) 94 by optical fiber cables 96A, 96B and 96C, respectively. These cables 96A–96C have two optical fibers for communication each. The controller PCB 52 is connected to the host by a connection cable 97 and receives, for example, image data over the cable 97.

Power is also fed to the panel PCB 94 from the power source unit 58, print engine PCB 51 or controller PCB 52 over a power source line, not shown. The print engine PCB 51, controller PCB 52, LCOT unit 8, DPX and LCIT PCB 91, MB PCB 93 and panel PCB 94 each includes a respective microcomputer.

Figure 4A:
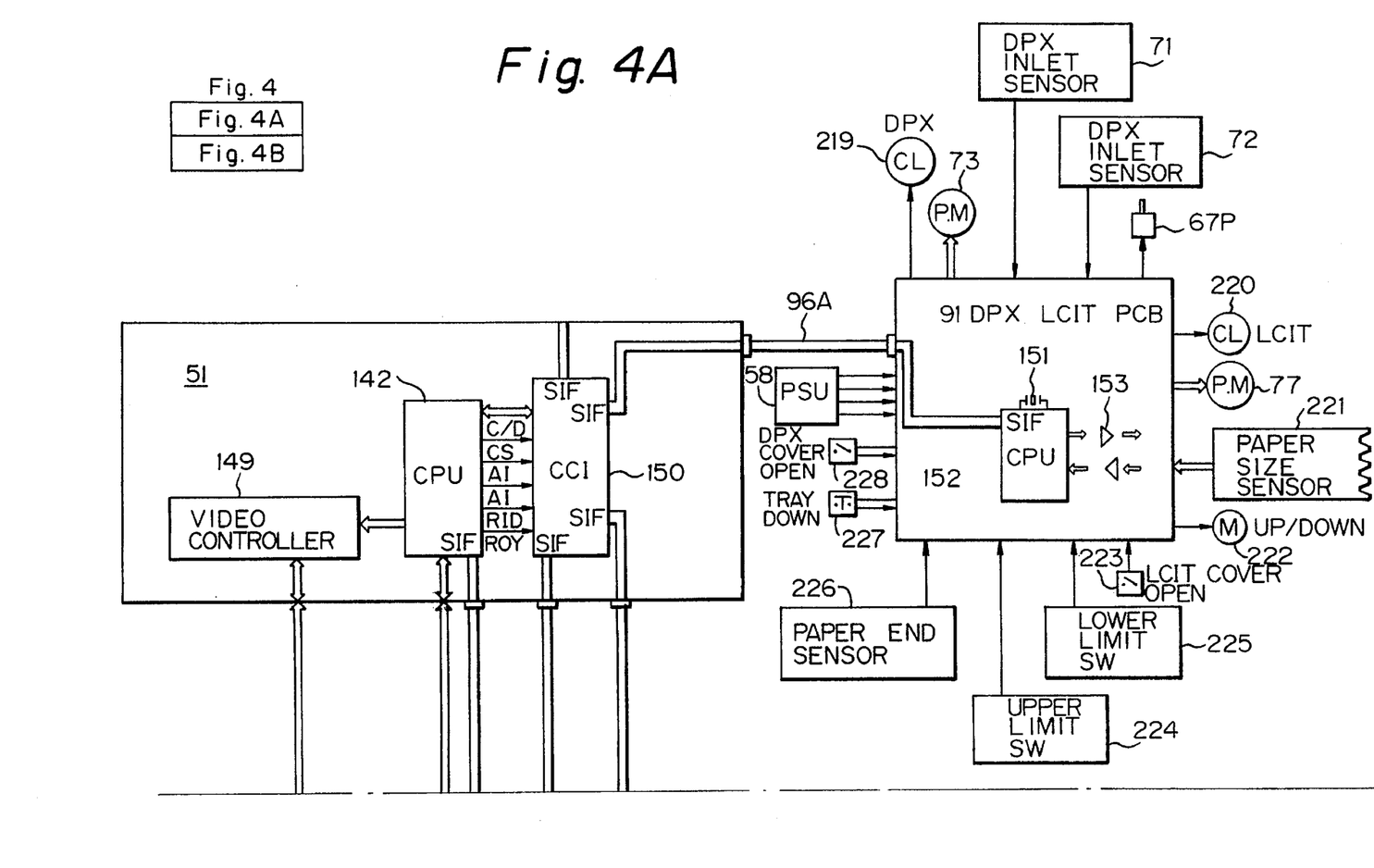
FIG. 4 is a block diagram schematically showing the connection of a print engine printed circuit board included in the control system and other printed circuit boards.
Figure 4B:
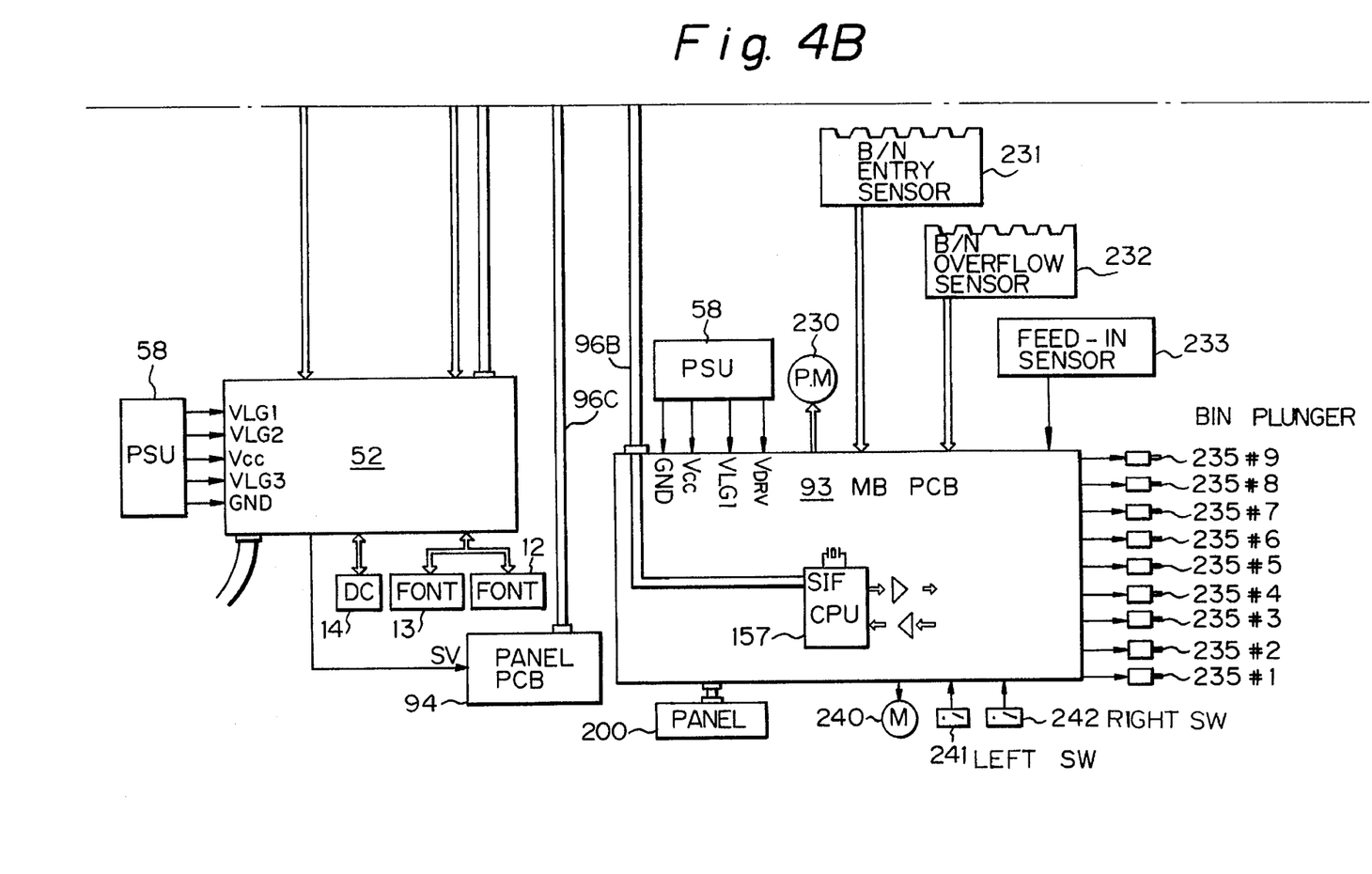

Referring to FIG. 4, the connection of the print engine PCB 51 and the other PCBs 52, 91, 93 and 24 will be described together with loads and sensors connected thereto. First, the power source unit (PSU) 58 rectifies and lowers the voltage fed from a commercially available AC power source 174, thereby outputting voltages $V_{CC}$, $V_{LG1}$, $V_{LG2}$ and $V_{DRV}$. The voltages $V_{CC}$, $V_{LG1}$, $V_{LG2}$ and $V_{DRV}$ are applied to the print engine PCB 51, controller PCB 52, DPX and LCIT PCB 91, and MB PCB 93. The supply of the voltage $V_{DRV}$ to the print engine PCB 51 is effected via an interlock switch, not shown. A voltage switching circuit is built in the PSU 58. The switching circuit feeds to the main fan 55 and PCB pack fan 54 the voltage $V_{DRV}$ during printing or the voltage $V_{LG1}$ lower than $V_{DRV}$ in a stand-by state. As a result, the rotation speed of the fans 54 and 55 differs from the printing condition to the stand-by condition.

The print engine PCB 51 is connected to the DPX and LCIT PCB 91, MB PCB 93 and panel PCB 94 by the optical fiber cables 96A–96C, as stated earlier. Specifically, as shown in FIG. 4, the print engine PCB 51 includes a communication control interface (CCI) 150 having serial interface ports SIF. A CPU (Central Processing Unit) 152, a CPU 157 and a CPU, not shown, are respectively included in the PCBs 91, 93 and 94. The SIFs of the CCI 150 are connected to the SIFs of such CPUs by optical communication lines via the optical fiber cables 96A–96C.

The print engine PCB 51 further includes a CPU 142, a drum counter (nonvolatile memory NVRAM or EEPROM) controlled by the CPU 142, and a power control circuit for controlling the emission power of the semiconductor laser. A laser driver for driving the semiconductor laser, including a laser diode and a photodiode for monitoring, is directly connected to a video controller 149 via the power control circuit. The video controller 149, receiving a feedback signal from the photodiode, maintains the emission intensity of the laser diode constant. At the same time, the video controller 149 selectively turns on or turns off the laser diode in accordance with a modulation signal matching the image data. In this manner, the video controller 149 controls the writing unit 40, FIG. 1, writing print data on the drum 29. A photodetector is provided for receiving the reflection from the polygon mirror 44 before the image is actually written on the drum 29. The output of the photodetector has its waveform shaped to turn out a synchronization detection signal. This signal is also input to the video controller 149 in order to regulate the time for starting writing the image.

Also connected to the print engine PCB 51 are various parts constituting the LCOT unit 8, i.e., the job separation motor for moving the trays in the right-and-left directions, sensors for sensing the positions of the trays, a plunger for actuating the path selector 81, a lower outlet switch, an upper outlet switch, and overflow sensors respectively associated with the upper and lower trays, and so forth.

A clutch 219, a drive motor 73 and an inlet sensor 71 for a duplex print mode are connected to the DPX and LCIT PCB 91. Also connected to the PCB 91 are a plunger 67P for actuating the path selector 67, a paper feed clutch 220 for the LCIT unit 7, a drive motor 77, a paper size sensor 221, a motor 222 for moving a paper stack up and down, a cover open switch 223, an upper limit switch 224, a lower limit switch 225, a paper end sensor 226, a switch 227 for lowering the tray, and a DPX unit cover open switch 228.

Connected to the MB PCB 93 are a transport motor 230, a bin empty sensor 231, a bin overflow sensor 232, a mail box inlet sensor (feed-in sensor) 233, plungers 235 #1 to #9, a job separation motor 240 for moving each bin in the right-and-left directions, and a left end switch 241 and a right end switch 242 respectively responsive to the right and left positions of each bin.

The controller PCB 52 is connected to the CPU 142 of the print engine PCB 51 and the video controller 149 by a number of signal lines. The PCB 52 is also connected to the font cartridges 12 and 13 and an emulation card 14. The voltage $V_{CC}$ is applied from the controller PCB 52 to the panel PCB 94.

Figure 5:
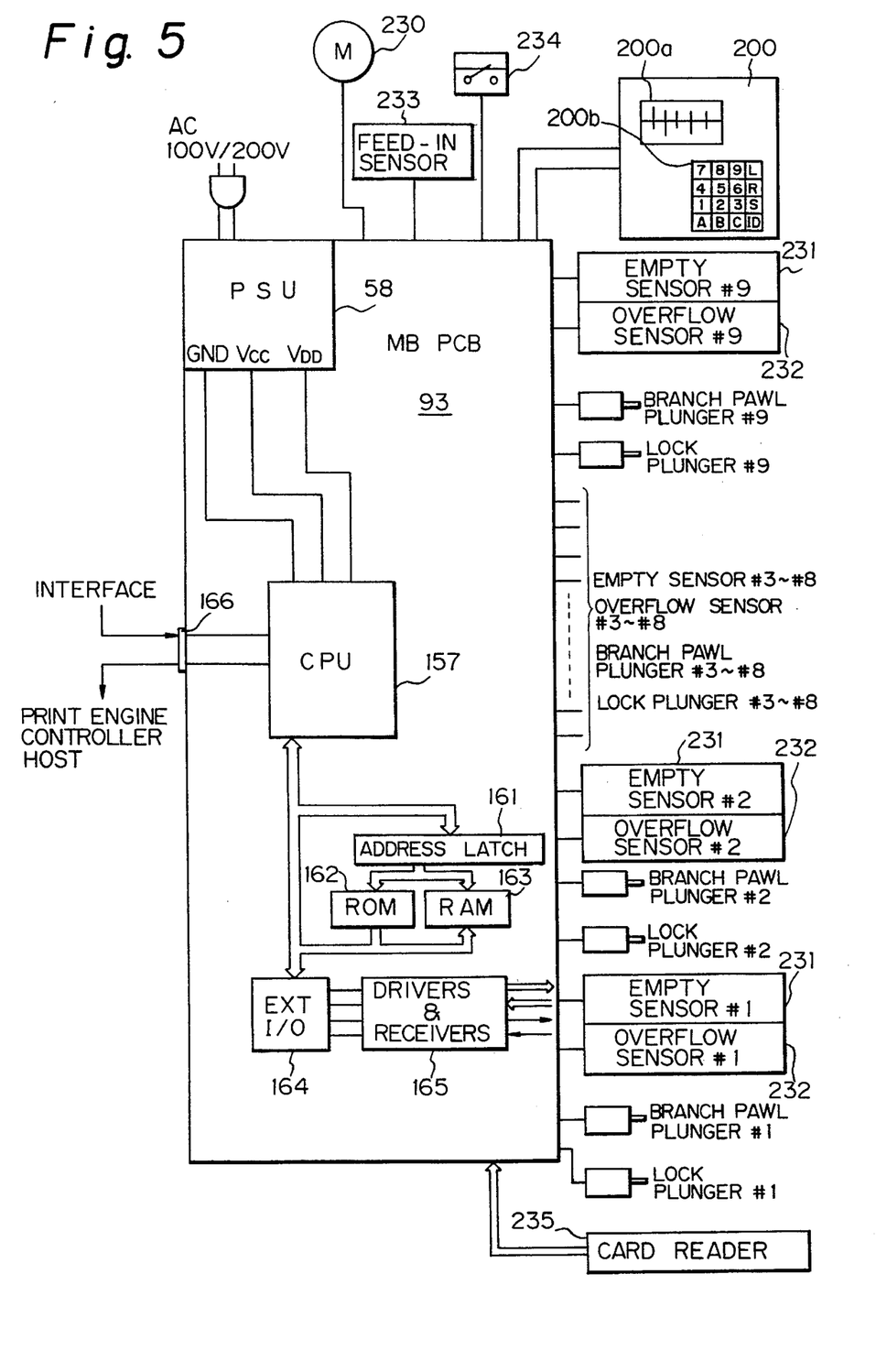
FIG. 5 is a schematic block diagram showing the connection of a mail box printed circuit board included in the control system and other sections.

FIG. 5 shows the MB PCB 93 in detail. As shown, the PCB 93 has an address latch 161, a ROM or program memory 162, a RAM or data memory 163, an extension I/O 164, drivers and receivers 165, and an interface 166 for controlling communication.

In the illustrative embodiment, the mail box 9 has bins #1 to #9 playing the role of mail boxes, and a bin #10 for general use. The bins #1 to #9 are respectively provided with lock plungers #1 to #9 for bin selection, branch pawl plungers #1 to #9, overflow sensors 232 #1 to #9, and bin empty sensors 231 #1 to #9. Further, the MB PCB 93 has a door switch 234 and a card reader 235 in addition to the previously mentioned conveyance motor 230 and feed-in sensor. The door switch 234 is responsive to the opening of a door which may be opened to remove a jamming paper. The operation and display 200 is made up of a display section 200a for displaying jams, the overflow of the bins and other information, and an operation section 200a accessible for unlocking the bins and for entering ID codes and other information. It is to be noted that the bin empty sensors 231 and bin overflow sensors 232 include a bin empty sensor and a bin overflow sensor assigned to the shared tenth bin #10 in addition to those of the first to ninth bins #1 to #9.

The interface 166 of the MB PCB 93 may be connected to the controller PCB 52 and host computer. However, from the system architecture standpoint, it is more preferable that the interface 166 interfaces the MB PCB 93 to the print engine, i.e., the mail box 9 forms part of the laser printer 1. In this configuration, the print engine can cover the entire procedure beginning with the input of a paper and ending with the output of the same.

Figure 6A:
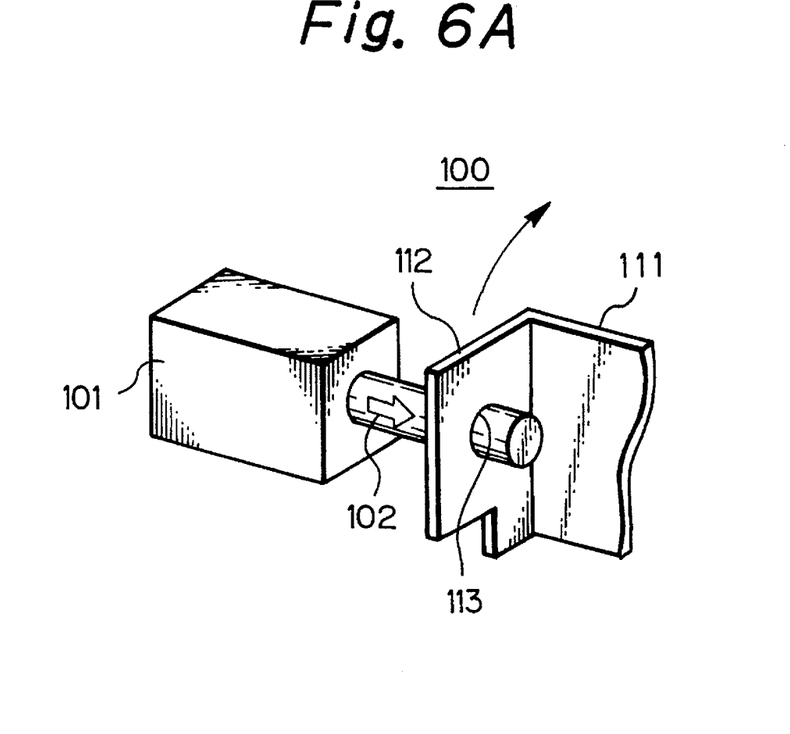
FIGS. 6A and 6B are fragmentary perspective views showing a locking mechanism included in the embodiment.
Figure 6B:
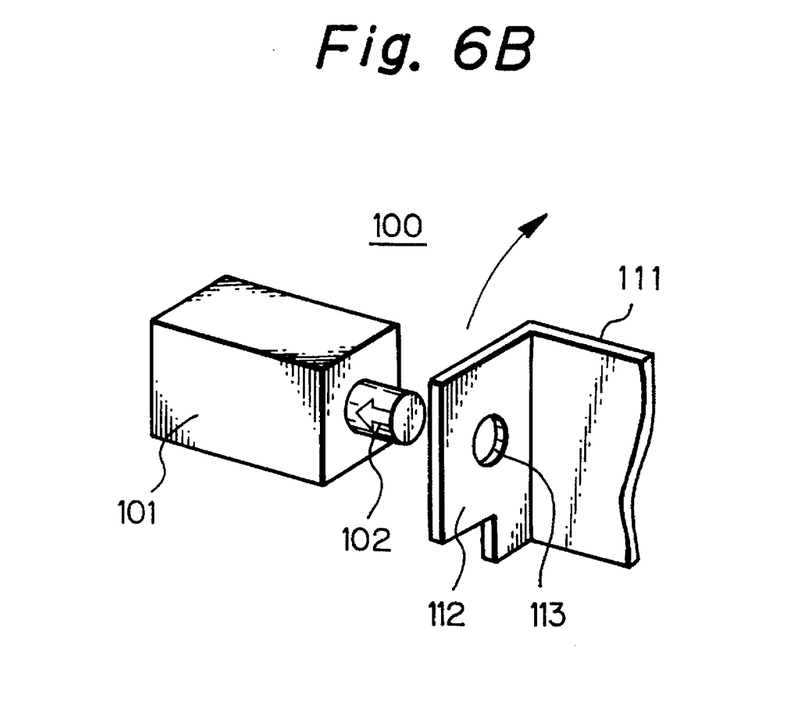

FIGS. 6A and 6B show a specific locking mechanism 100 associated with each of the bins or mail boxes #1 to #9. As shown, the mechanism 100 is implemented by a solenoid 101 having a plunger 102. The bins #1 to #9 each has a cover 111 at the front end thereof. A hole 113 is formed in the front wall of the cover 111. When the plunger 102 protrudes into the cover 111 via the hole 113, it prevents the cover 111 from being opened in a direction indicated by an arrow. The solenoid 101 is of the type extending the plunger 102 when deenergized. FIGS. 6A and 6B show the solenoid 101 in the deenergized state and the energized state, respectively.

Specifically, when the solenoid 101 is deenergized, the plunger 102 protrudes into the cover 111 via the hole 113 and thereby locks the cover 111. When the solenoid 101 is energized, the plunger 102 retracts from the cover 111 and thereby unlocks cover 111. In this condition, the cover 111 is ready to be opened by hand. Why the plunger solenoid 101 of this type is used is that the third party should be prevented from using the bin. Any other kind of locking mechanism may be used if such a consideration is not necessary.

Figure 7:
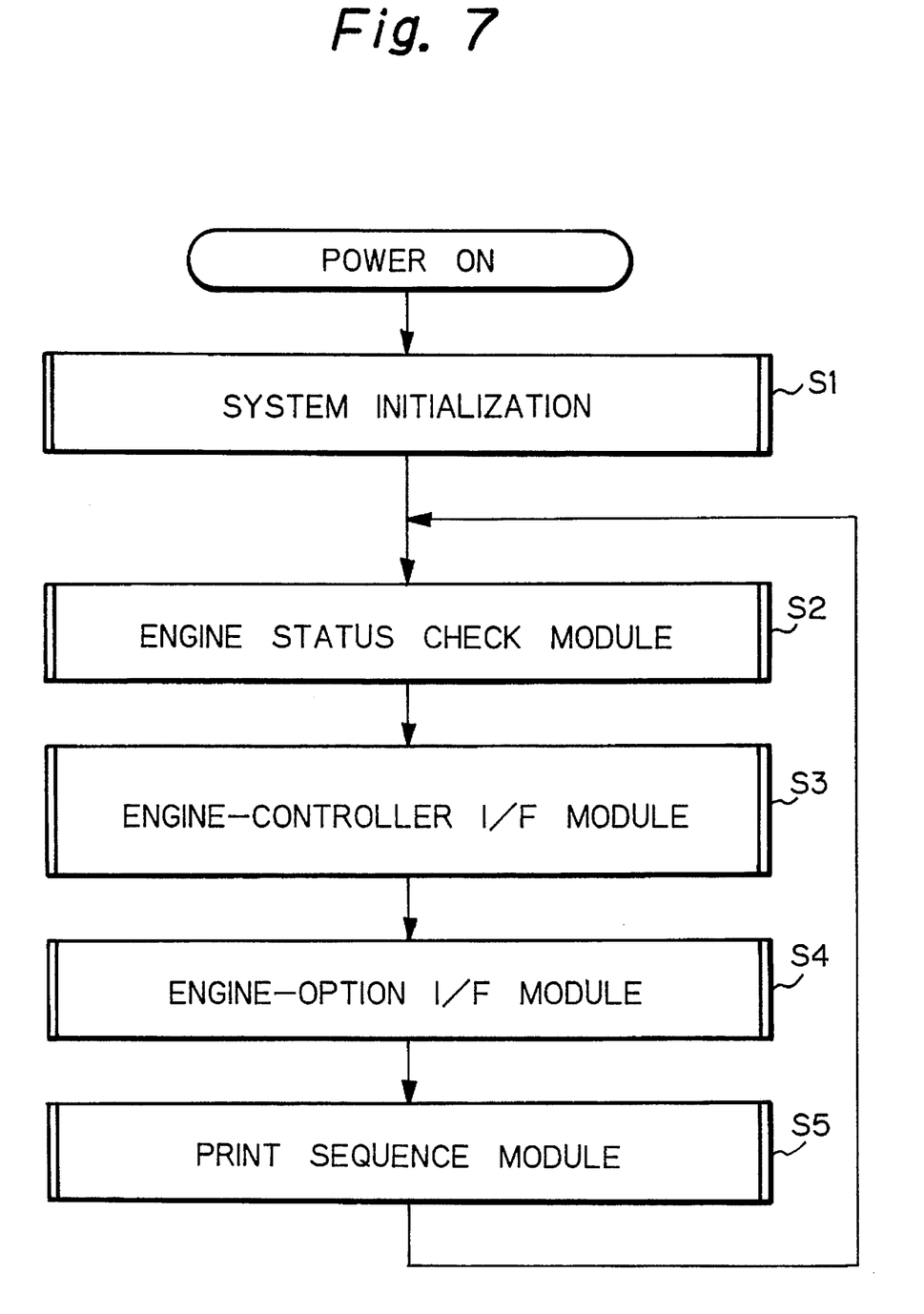
FIG. 7 is a flowchart demonstrating a general control procedure of the embodiment.

Referring to FIG. 7, a procedure for controlling the entire printer will be described. First, after the power-up, the various statuses included in the system are initialized (step S1). Then, an engine status check module or subroutine is executed to check conditions inside the print engine itself, e.g., a maintenance request and errors (step S2). This is followed by an engine-controller interface module or subroutine for checking the interface control between the print engine and the controller (step S3). Subsequently, an engine-option interface module or subroutine is executed to control the interfaces connecting the print engine and optional equipment (step S4). This is followed by a module or subroutine for controlling the sequence, i.e., paper transport timings and high voltage ON/OFF timings (step S5). Then, the program returns to the step S2.

Figure 8:
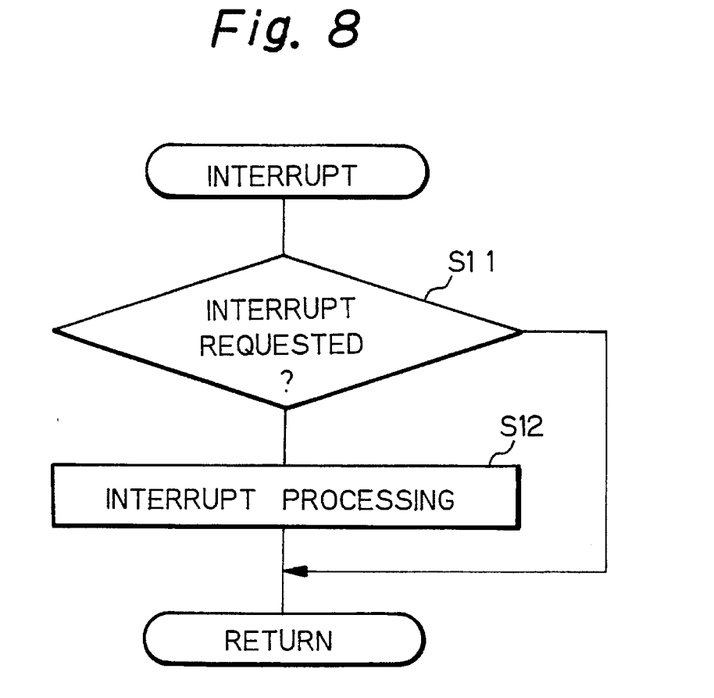
FIG. 8 is a flowchart representative of an interrupt control procedure of the embodiment.

FIG. 8 shows an interrupt module or routine for allowing various kinds of processing to be performed independently of the main sequence of FIG. 7. This routine occurs every predetermined period of time preselected by the print engine CPU 142. First, whether or not an interrupt request has appeared is determined (step S11). If the answer of the step S11 is negative, NO, the program returns. If the answer of the step S12 is positive, YES, predetermined interrupt processing is executed (step S12).

Figure 9:
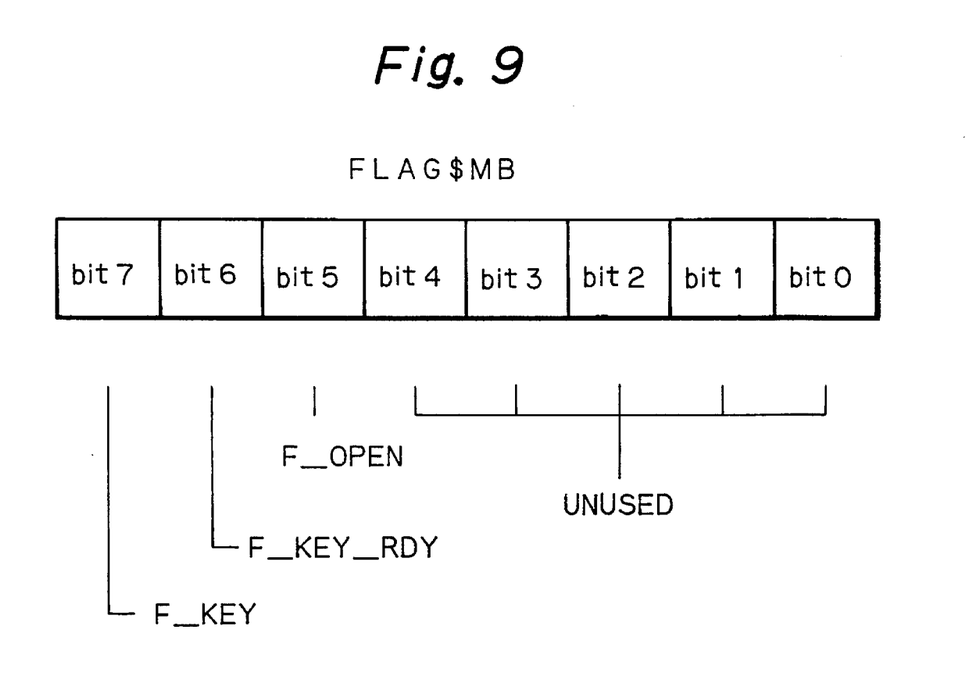
FIG. 9 shows a control flag particular to the embodiment.

FIG. 9 shows a control flag FLAG$MB. As shown, the control flag FLAG$MB has one byte or eight bits in total, i.e., bits 0–7 representative of a particular status each. The bit F_OPEN (bit 5) is representative of whether or not the cover 111 of the mail box is open; it is in an ON state if the cover 111 is closed or in an OFF state if otherwise. The bit F_KEY_RDY (bit 6) shows whether or not the bins #1–#10 of the mail box 9 are empty; it is in an ON state if all the bins #1–#10 are empty or in an OFF state if at least one of them is not empty. The bit F_KEY_RDY is one of the conditions for determining whether or not to lock the cover 111 (key lock) again when it is opened and then closed. The ON state of the bit F_KEY_RDY is representative of a condition close to a condition wherein the cover 111 may be locked. The bit F_KEY (bit 7) shows whether or not the cover 111 is locked, i.e., whether or not a key lock state is set up; it is in an ON state if such a state is set up or in an OFF state if otherwise. In the illustrative embodiment, the bits 0–4 are not used.

Figure 10:
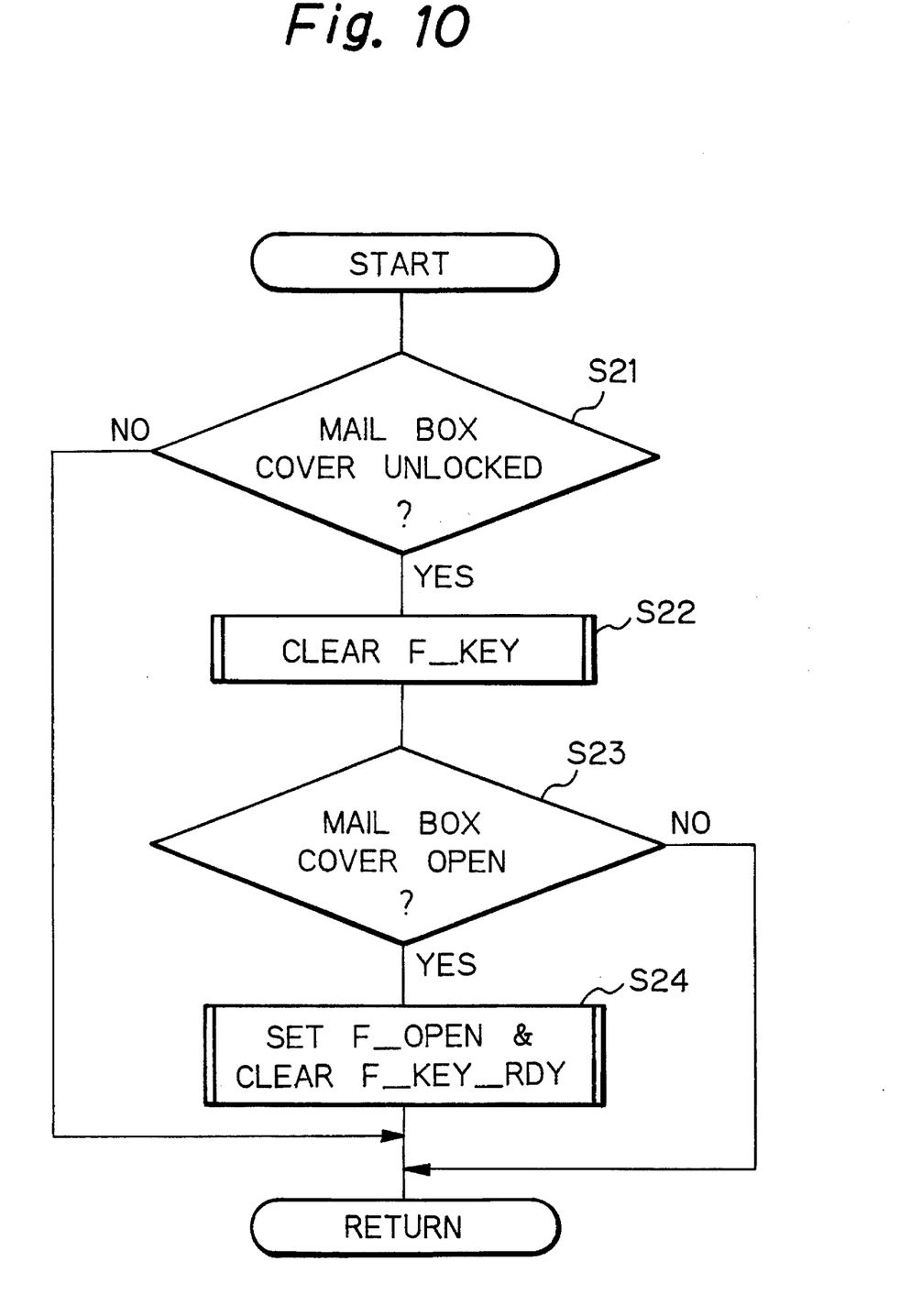
FIG. 10 is a flowchart representative of a key lock check procedure of the embodiment.

A key lock check procedure will be described with reference to FIG. 10. First, whether or not the key lock of the cover 111 has been cancelled is determined (step S21). If the answer of the step S21 is NO, the program returns. If the answer of the step S21 is YES, the bit F_KEY of the control flag FLAG$MB is cleared. Then, whether or not the cover 111 is open is determined on the basis of the bit F_OPEN (step S23). If the answer of the step S23 is NO, the program returns. If it is YES, the bit F_OPEN is set while the bit F_KEY_RDY is cleared (step S24). Then, the program returns.

Figure 11:
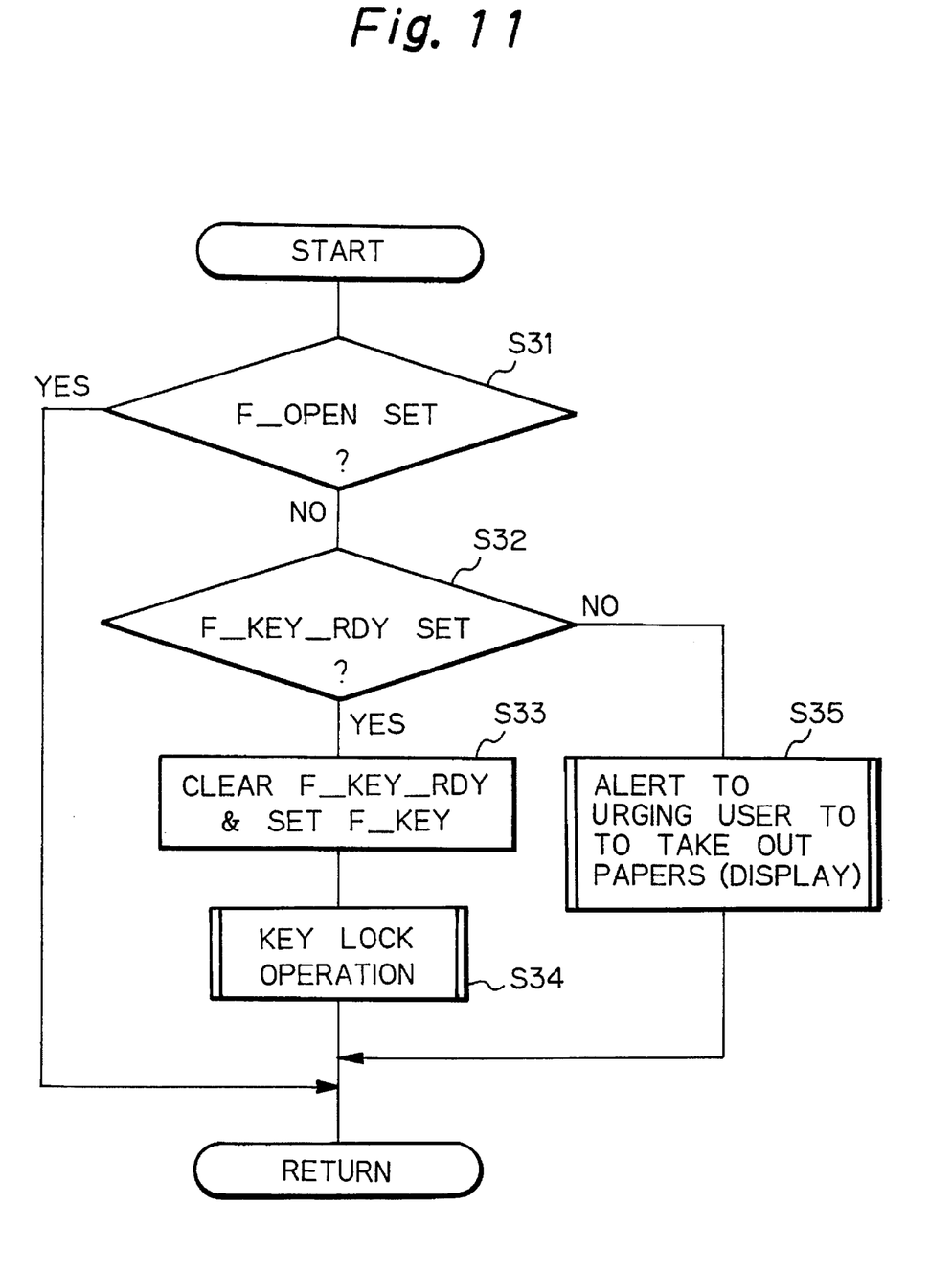
FIG. 11 is a flowchart representative of a key locking operation of the embodiment.

FIG. 11 shows a key lock procedure for locking the cover 111. As shown, whether or not the cover 111 is open is determined on the basis of the bit F_OPEN (step S31), as stated above. If the bit F_OPEN is in the ON state, meaning that the cover 111 is open, the program returns. If otherwise, whether or not the bit F_KEY_RDY is set, i.e., whether or not all the bins #1–#10 are empty is determined. If all the bins #1–#10 are open, the bit F_KEY_RDY is cleared while the bit F_KEY is set (step S33). Subsequently, a key locking operation is performed to lock the cover 111 (step S34).

If the answer of the step S32 is NO, meaning that a paper or papers are left in any of the bins #1–#10, the cover 111 is not locked. At this instant, an alert for urging the user to take out all the papers from the mail box 9 is produced (step S35), and then the program returns. The alert may be implemented as a simple indication showing that sheets are left in the bin. Alternatively, an alert command may be sent to the controller or the host computer over the communication line, causing it to display the alert on a preselected display.

Figure 12:
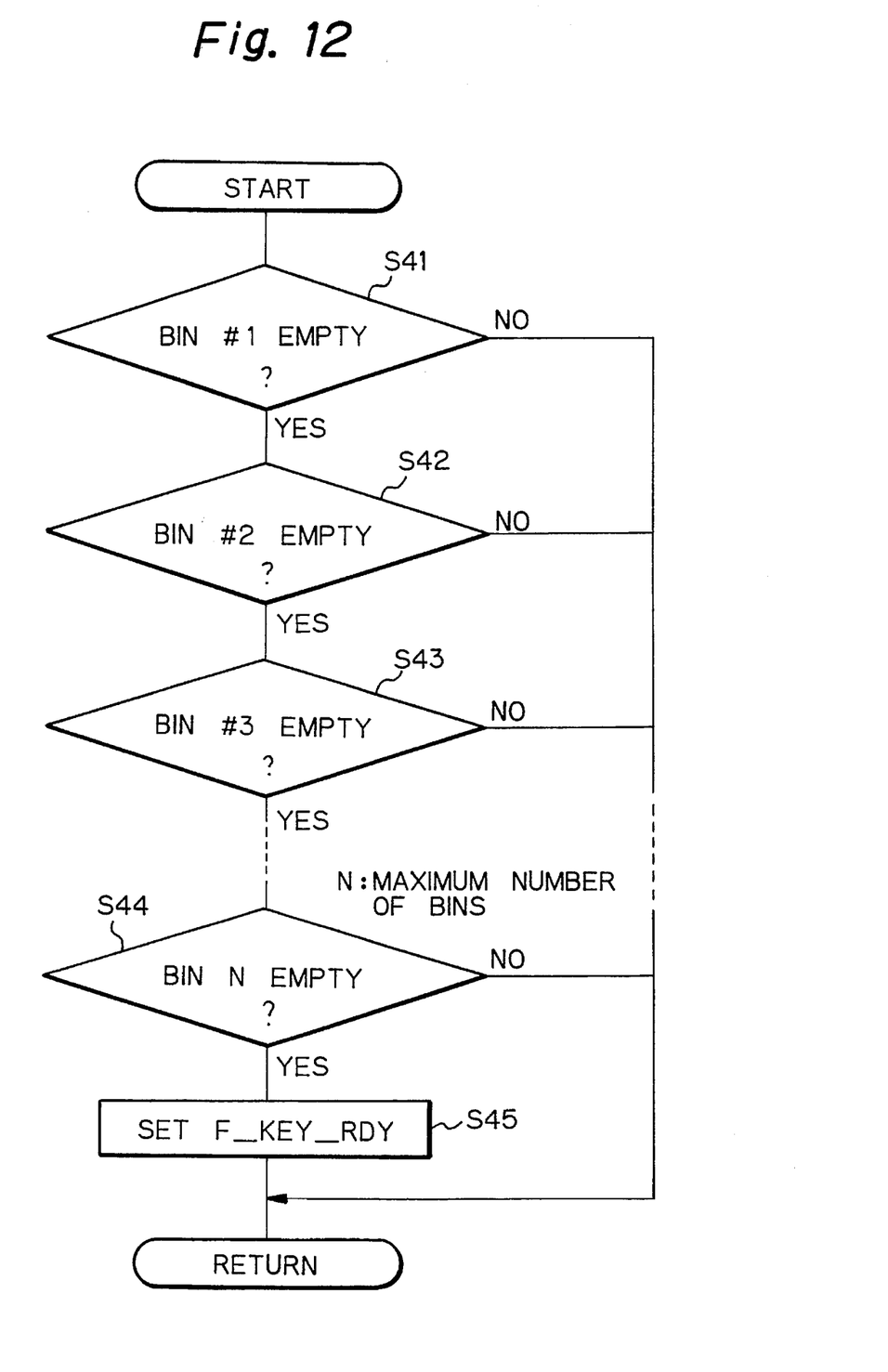
FIG. 12 is a flowchart representative of a bin empty check procedure of the embodiment.

Whether or not papers are left in the mail box 9 is determined on the basis of the bit or flag K_KEY_RDY, as stated above. A mail box empty check procedure will be described with reference to FIG. 12. As shown, every predetermined period of time or on a preselected condition, whether or not papers are present is determined throughout the bins #1–#10 (step S41–S44). If all the bins #1–#10 are empty, the bit F_KEY_REDY is set. Then, the program returns. If at least one of the bins is not empty, the bit F_KEY_RDY is not set, and the program returns.

In summary, it will be seen that the present invention provides an image forming system having various unprecedented advantages, as enumerated below.

(1) The system prevents the cover of a bin from being locked in its closed position unless papers output to all the bins are taken out. Hence, all the bins are empty when they are used later, and can be used by any users. This implements a mail box which can be efficiently used by many users.

(2) The system produces an alert for informing the user of why the cover is inhibited from being locked. The user can, therefore, take an adequate measured.

Various modifications will become possible for those skilled in the art after receiving the teachings of the present disclosure without departing from the scope thereof.

What is claimed is:

1. An image forming system comprising:

a printer;

a mail box comprising a plurality of bins controlled by a command from a host computer via serial communication between said host computer and said printer;

a cover covering one of said bins for personal use;

locking means for locking said cover;

detecting means for determining whether or not a paper is present in any of said bins; and control means for inhibiting, after said cover has been unlocked, then opened, and then closed, said locking means from locking said cover if said detecting means determines that a paper is left in any of said bins.

2. A system as claimed in claim 1, wherein said control means produces an alert representative of the presence of the paper, while inhibiting said locking means from locking said cover.

3. A system as claimed in claim 2, wherein said alert is displayed on at least one of display means of said host computer and display means of said mail box.

4. An image forming system comprising:

a printer;

a mail box comprising a plurality of bins controlled by a command from a host computer via serial communication between said host computer and said printer;

a cover covering one of said bins for personal use;

a lock locking said cover;

a detector determining whether or not a paper is present in any of said bins; and a controller for inhibiting, after said cover has been unlocked, then opened, and then closed, said lock from locking said cover if said detector determines that a paper is left in any of said bins.

5. A system as claimed in claim 4, wherein said controller produces an alert representative of the presence of the paper, while inhibiting said lock from locking said cover.

6. A system as claimed in claim 5, wherein said alert is displayed on at least one of a display of said host computer and a display of said mail box.

* * * * *